(12) United States Patent
Den Boestert et al.

(10) Patent No.: US 8,123,946 B2
(45) Date of Patent: Feb. 28, 2012

(54) METHOD AND APPARATUS FOR REMOVING METAL SULPHIDE PARTICLES FROM A LIQUID STREAM

(75) Inventors: Johannes Leendert Willem Cornelis Den Boestert, Amsterdam (NL); Arian Nijmeijer, Amsterdam (NL); Wim M Bond, Amsterdam (NL); Hubert Willem Schenck, Pernis (NL)

(73) Assignee: Shell Oil Company, Houston, TX (US)

( * ) Notice: Subject to any disclaimer, the term of this patent is extended or adjusted under 35 U.S.C. 154(b) by 119 days.

(21) Appl. No.: 12/282,530

(22) PCT Filed: Mar. 14, 2007

(86) PCT No.: PCT/EP2007/052383
§ 371 (c)(1),
(2), (4) Date: Sep. 11, 2008

(87) PCT Pub. No.: WO2007/104769
PCT Pub. Date: Sep. 20, 2007

(65) Prior Publication Data
US 2009/0065432 A1   Mar. 12, 2009

(30) Foreign Application Priority Data
Mar. 16, 2006   (EP) .................................. 06111226

(51) Int. Cl.
*B01D 11/00*   (2006.01)
*B01D 24/00*   (2006.01)
(52) U.S. Cl. ........ 210/644; 210/648; 210/641; 210/785; 210/186; 210/197; 210/296; 210/322
(58) Field of Classification Search .................. 210/644, 210/648, 197; 95/45, 195, 203, 227, 235, 95/187, 199, 234, 181; 423/224
See application file for complete search history.

(56) References Cited

U.S. PATENT DOCUMENTS 3,899,312 A * 8/1975 Kruis et al. ..................... 62/625
(Continued)

FOREIGN PATENT DOCUMENTS

DE   10023661   11/2001
(Continued)

OTHER PUBLICATIONS

The Vertical Pressure Leaf Filter, 2002, http://web.archive.org/web/20020818104037/http://www.solidliquid-separation.com/pressurefilters/verticalleaf/verticalleaf.htm, accessed Mar. 2, 2010 online.*

(Continued)

*Primary Examiner* — Krishnan S Menon
*Assistant Examiner* — Allison M Gionta
(74) *Attorney, Agent, or Firm* — Charles W. Stewart

(57) ABSTRACT

The invention provides a method for removal of metal sulphide particles from a liquid stream comprising a solvent and metal sulphide particles, using a filter system comprising at least one membrane, the method comprising contacting the liquid stream with the membrane, thereby transferring metal sulphide particles from the liquid stream onto the membrane surface to obtain a liquid stream depleted of metal sulphide particles and a filter system comprising a membrane enriched in metal sulphide particles. The invention further provides an apparatus for removal of metal sulphide particles from a liquid stream comprising a solvent and metal sulphide particles, wherein the apparatus comprises a solvent regenerator column (1) comprising at least one inlet and two outlets, which solvent regenerator column is connected to filter system (2) comprising at least one membrane and comprising at least one inlet and one outlet, which the filter system is connected to a separation column (3) comprising at least one inlet and two outlets.

22 Claims, 1 Drawing Sheet

U.S. PATENT DOCUMENTS

| | | | |
|---|---|---|---|
| 4,142,875 A * | 3/1979 | Bohmholdt et al. | 95/205 |
| 4,370,236 A * | 1/1983 | Ferguson | 210/634 |
| 4,478,799 A * | 10/1984 | Bengeser et al. | 423/224 |
| 5,190,662 A * | 3/1993 | Keller et al. | 210/673 |
| 6,139,605 A * | 10/2000 | Carnell et al. | 95/164 |
| 2001/0002008 A1 * | 5/2001 | Yorita et al. | 210/496 |
| 2005/0035326 A1 | 2/2005 | Meyer et al. | 252/62 |

FOREIGN PATENT DOCUMENTS

| | | |
|---|---|---|
| EP | 0526100 | 2/1993 |
| EP | 1506806 | 2/2005 |
| JP | 2000061274 | 2/2000 |
| WO | WO9627430 | 9/1996 |

OTHER PUBLICATIONS

Wypych, Handbook of Solvents, 2001, Chapter 12.1.1, Permeability, p. 694, para. 3.*

Written Translation of (WO9627430A1).*

Lewis et al: "An exploration into the sulphide precipitation method and its effect on metal sulphide removal" Hydrometallurgy, Elsevier Scientific Publishing CY. Amsterdam, NL, vol. 81, No. 3-4, Mar. 2006, pp. 197-204, XP005324072 ISSN: 0304-386X.

Maarten van der Burgt et al., in "The Shell Middle Distillate Synthesis Process, Petroleum Review Apr. 1990 pp. 204-209".

International Search Report, International Application No. PCT/EP2007/052383.

* cited by examiner

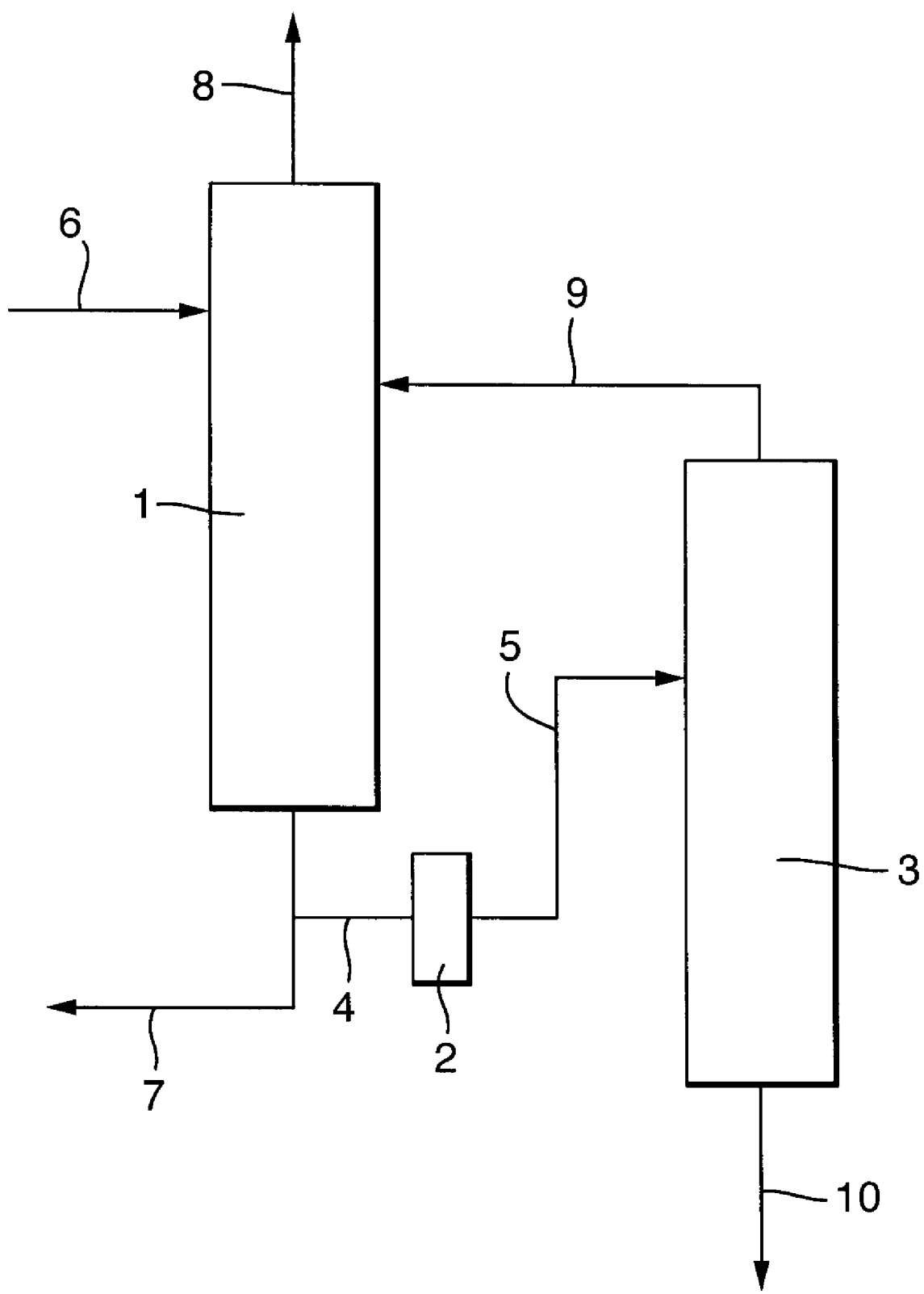

METHOD AND APPARATUS FOR REMOVING METAL SULPHIDE PARTICLES FROM A LIQUID STREAM

The invention relates to a method and an apparatus for removing metal sulphides from a liquid stream comprising solvent and metal sulphide particles.

Metal sulphide particles in a liquid stream can be formed when metal carbonyls react with sulphur compounds. Metal sulphide particles can cause fouling by deposition, encrusting or baking onto surfaces of process equipment, for example on trays of separating columns and/or on surfaces of liquid passages so that these passages can be blocked. Deposition of metal sulphide particles can lead to the process equipment being rendered inoperative in whole or in part. Thus, removal of metal sulphide particles from the liquid stream is desirable.

Methods to remove metal sulphides from a liquid stream are known in the art. For example, in U.S. 2005/0035326 a method for removal of metal sulphides from a methanol scrubbing solution is described. In the method described in U.S. 2005/0035326, a methanol scrubbing solution containing colloidal metal sulphides is introduced in a precipitation vessel, where the solution is heated to cause growth and agglomeration of the metal sulphide particles therein. The methanol scrubbing solution containing agglomerated metal sulphides is then introduced into a methanol/water separation vessel and a rising stream of methanol vapour is passed in counterflow to a descending stream of water, resulting in a product enriched in methanol and a product enriched in water and comprising metal sulphides. These two products are separated. Finally, metal sulphides are removed from the product enriched in water and comprising metal sulphides.

The method described in U.S. 2005/0035326 has several drawbacks. One drawback is that the method is time-consuming, as it requires allowing growth and agglomeration of the metal sulphide particles in order to enable their removal. Another drawback is that the method is cumbersome: several steps are needed to effect removal of the metal sulphides. Yet another drawback is that a heating step is needed, thus requiring additional input of energy and necessitating additional heating means.

It has now been found that metal sulphide particles can be removed in a simple and effective way using a filter system comprising a membrane.

To this end, the invention provides a method for removal of metal sulphide particles from a liquid stream comprising a solvent and metal sulphide particles, using a filter system comprising at least one membrane, the method comprising contacting the liquid stream with the membrane, thereby transferring metal sulphide particles from the liquid stream onto the membrane surface to obtain a liquid stream depleted of metal sulphide particles and a filter system comprising a membrane enriched in metal sulphide particles.

The invention further provides an apparatus for removal of metal sulphide particles from a liquid stream comprising a solvent and metal sulphide particles, wherein the apparatus comprises a solvent regenerator column (1) comprising at least one inlet and two outlets, which solvent regenerator column is connected to filter system (2) comprising at least one membrane and comprising at least one inlet and one outlet, which the filter system is connected to a separation column (3) comprising at least one inlet and two outlets.

The method and apparatus according to the invention enables removal of metal sulphides to low levels, even in the ppbv range. As there is no need to wait for the metal sulphide particles to grow and/or agglomerate, removal of the metal sulphide particles is much less time-consuming. Furthermore, metal sulphide removal can be easily incorporated into an existing industrial process wherein a liquid stream comprising metal sulphide particles needs to be purified. Finally, the membrane enriched in metal sulphide particles can be regenerated. The use of more than one filter system thus enables a continuous process wherein one filter system is employed to remove metal sulphide particles and the other filter system is regenerated, without having to take the filter system off-line for cleaning.

The method can be applied to any liquid stream comprising solvent and metal sulphide particles. Such a liquid stream can for example be a liquid stream derived from a refinery process where a liquid is used to remove contaminants including metal carbonyls and sulphur compounds, especially hydrogen sulphide, from a gas stream comprising these contaminants. This results in a purified gas stream, which can be further processed, and a liquid stream which now comprises metal carbonyls and sulphur compounds. Metal carbonyls can be converted to their corresponding metal sulphides by reacting with the sulphur contaminants.

Thus, in a preferred embodiment the liquid stream is obtained by the steps of:
(i) contacting a gas stream comprising hydrogen sulphide and metal carbonyls with a solvent, thereby obtaining solvent enriched in hydrogen sulphide and in metal carbonyls;
(ii) heating and depressurising the solvent enriched in hydrogen sulphide and in metal carbonyls, thereby converting at least part of the metal carbonyls to metal sulphide particles, to obtain the liquid stream comprising solvent and metal sulphide particles.

Step (i) is preferably performed at a temperature in the range of from −70 to 40° C., more preferably from −60 to 0° C. The preferred temperature ranges ensure better transfer of metal carbonyls and of hydrogen sulphide from the gas stream to the solvent.

Step (ii) is preferably performed at a temperature in the range of from 60 to 110° C., more preferably from 70 to 90° C. At these preferred temperatures, a higher degree of conversion of metal carbonyls to metal sulphides takes place.

The gas stream comprising hydrogen sulphide and metal carbonyls can for example be a synthesis gas stream.

The main constituents of synthesis gas are carbon monoxide and hydrogen. Synthesis gas can be prepared in a synthesis gas generation unit, for example high temperature reformers, autothermal reformers or gasifiers using coal, oil residue or natural gas as feedstock. Reference is made to Maarten van der Burgt et al., in "The Shell Middle Distillate Synthesis Process, Petroleum Review April 1990 pp. 204-209" for a general description on the preparation of synthesis gas.

Depending on the feedstock used to generate synthesis gas, contaminants such as hydrogen sulphide, carbonyl sulphide, hydrogen cyanide and to a lesser extent carbonyl disulphide will be present in the synthesis gas exiting the synthesis gas generation unit. In addition, the conditions in the synthesis generation unit are usually such that metal carbonyls will be formed and these will also be present as contaminants in the synthesis gas exiting the synthesis gas generation unit.

Because synthesis gas is generally further processed in catalytic conversion reactions, removal of these contaminants to low levels is often desired. As described hereinbefore, one way of removal of contaminants in synthesis gas is by contacting the synthesis gas with a solvent to transfer contaminants from the synthesis gas to the solvent, thereby obtaining a purified synthesis gas stream and a liquid stream comprising a solvent, metal carbonyls and hydrogen sulphide. Metal carbonyls such as nickel tetra carbonyl and iron pentacarbonyl, especially in combination with hydrogen sulphide, can undergo thermal and/or chemical decomposition to metal sulphides. Even low concentrations of metal carbonyl, translating into low concentrations of metal sulphides, can create problems.

It has been found that the degree of fouling due to metal sulphide particles becomes especially cumbersome when metal sulphide particles are present in a concentration of 4 ppmv or more, especially 5 ppmv or more. Thus, the method is especially suitable for liquid streams comprising at least 4 ppmv, preferably at least 5 ppmv of metal sulphide particles, which corresponds to similar concentrations of metal carbonyls in the gas stream.

The solvent can be any solvent used in industrial processes. The term solvent is known to the skilled person and is used for a solvent capable of absorbing contaminants while giving little or no (chemical) reaction with them. Suitable solvents include one or more solvents selected from the group of include sulfolane (cyclo-tetramethylenesulfone and its derivatives), aliphatic acid amides, N-methylpyrrolidone, N-alkylated pyrrolidones and the corresponding piperidones, methanol, ethanol and dialkylethers of polyethylene glycols. The preferred solvent is methanol.

It will be understood that the membrane material should not dissolve easily in the solvent used under the prevalent conditions. Thus, the combination of membrane material and solvent should be chosen such that the membrane will show little or no solubility in the solvent.

The method is especially suitable for a liquid stream wherein the solvent is methanol and the metal sulphide particles are nickel-sulphide particles and/or iron-sulphide particles.

A filter system comprising at least one membrane is used.

The liquid stream is brought into contact with the membrane and passes through the membrane. The side of the membrane contacted with the liquid stream is referred to as the feed side of the membrane. The membrane can be any type of membrane suitable for the purpose of preventing metal sulphide particles from passing.

In one embodiment, the membrane is porous and the pore size of the membrane is lower than the size of the smallest metal sulphide particles. Without wishing to limit the invention to the removal of metal sulphide particles of a particular particle size, it is believed that a typical range for the average particle size of the metal sulphide particles is from 10 nm to 5 micron, preferably from 10 nm to 1 micron. Thus, it is preferred to use a porous membrane having a pore size of less than 0.1 micron, more preferably less than 0.01 micron so that metal sulphide particles are prevented from passing though the membrane pores.

Suitable porous membranes include membranes of the type commonly used for ultrafiltration, nanofiltration or reverse osmosis, especially ultrafiltration. These membranes are preferably fabricated from one or more materials selected from the group of cellulose, ceramic materials, metal mesh, polyacrylonitrile (PAN), polyamidimide+titaniumdioxide (PAI), polyetherimide (PEI), polyvinylidenedifluoride (PVDF) and polytertafluoroethylene (PTFE).

It has been found that a membrane fabricated from polyvinylidenedifluoride (PVDF) gives excellent results in removal of metal sulphide particles.

Preferably, a porous membrane having a crosslinked structure is used as for example described in WO-A-962743. It is believed that the crosslinked structure provides higher mechanical strength and/or better resistance against dissolving in the solvent to which the membrane is exposed.

Alternatively, a dense membrane may be used. Dense membranes are known to the person skilled in the art and have properties allowing solvents to pass through them by dissolving in and/or diffusing through their structure. It will be understood that preferably a dense membrane is used having a sufficient permeability for the solvent to pass, meaning that the properties of the dense membrane should be such that the solvent should be able to dissolve in and/or diffuse through the membrane. Suitable dense membranes include membranes fabricated from polysiloxane, preferably polydimethyl siloxane (PDMS).

Preferably a dense membrane is used having a cross-linked structure as for example described in the earlier mentioned patent application WO-A-9627430.

In a preferred embodiment, a membrane is used which allows a flux, expressed as amount of solvent in kg solvent permeating through the membrane per square meter per day, of at least 1200 kg/m2/day. Lower values are not considered to be economically attractive.

After contacting the liquid stream comprising metal sulphide particles with the membrane, metal sulphide particles will be deposited onto the surface of the membrane at the feed side of the membrane, resulting in a membrane enriched in metal sulphide particles, and liquid depleted from metal sulphide particles will pass through the membrane. The other side of the membrane is referred to as the back side. In order to allow the method to be performed in a continuous manner, it is preferred to remove at least part of the metal sulphide particles from the membrane surface after a certain time period.

One way to achieve removal of deposited metal sulphide particles from the membrane is to use a filter system which further comprises, in addition to the membrane, filter elements which can be moved in a vibratory manner and/or can be rotated. These filter elements include plates, tubular or spirally wound metal elements. In a preferred embodiment, cricket shaped hollow pipes which are covered with membrane material are used. By blowing gas, for example nitrogen gas, through the hollow pipes, metal sulphide particles can be removed from the membrane surface. The filter elements can also include one or more hollow filter plates to which the membrane is attached. If more than one filter plate is used, the filter plates may be stacked and the liquid stream can be lead in a perpendicular direction to the stacked filter plates.

One way of cleansing the membrane comprising metal sulphide particles is by moving the filter elements in a vigorous vibratory motion tangent to the surface of the membrane enriched in metal sulphides, thereby causing metal sulphide particles to be repelled from the membrane surface. This cleansing step is especially suitable in the event that the filter elements comprises one or more flat disks, the disks oriented in a parallel direction with respect to each other and with membranes attached to the upper side of the disks. The stack of disks is then oscillated to apply the vibratory motion.

Alternatively, the membrane enriched in metal sulphide particles is cleansed by rotating the filter elements to create a shear force on the membrane enriched in metal sulphides, thereby causing metal sulphide particles to be repelled from the membrane surface. By applying this cleansing step, a fresh membrane is obtained which can then be used again to remove metal sulphide particles from the liquid stream.

A combination of vibratory and rotational movement to cleanse the membrane may also be applied.

Removal of metal sulphide particles from the membrane surface can also be achieved through the use of a pre-coated membrane, especially when a dense membrane is used. Such a pre-coated membrane is coated with a substance onto which metal sulphides will adhere. After a certain time, the coating comprising metal sulphide particles is rinsed off the membrane surface and discarded. Rinsing the coating can be done using any suitable solvent. Preferably, the same solvent as present in the liquid stream is used. Suitably, a concentrated amount of rinsing solvent is brought into contact with the back side of the membrane during a short time-interval (time pulse) in order to rinse off the coating. Preferably, a fresh coating is applied to the membrane surface after discarding the coating comprising metal sulphides, so that the membrane is ready for the next filtration duty. In this way, the risk of irreversible fouling of the membrane is brought down to a minimum or can even be completely avoided.

To facilitate method control, in a preferred embodiment a means to detect the degree of metal sulphide deposition on the membrane is used. This means can for example be a system to measure the liquid pressure on both sides of the membrane, using the situation where a clean membrane is in contact with liquid in the absence of metal sulphide particles as starting point. An increase in pressure difference would indicate that metal sulphides have deposited onto the membrane. The pressure difference can then be used as an indicator to determine when the membrane needs to be cleansed.

The liquid stream is suitably contacted with the membrane at a temperature in the range of from −20 to 100° C., preferably from 10 to 100° C., more preferably from 30 to 85° C.

The invention further provides an apparatus for removal of metal sulphide particles from a liquid stream comprising a solvent and metal sulphide particles, as shown in the FIGURE. The apparatus comprises a solvent regenerator column (1) comprising at least one inlet and two outlets, which solvent regenerator column is connected to filter system (2) comprising at least one membrane and comprising at least one inlet and one outlet, which filter system is connected to a separation column (3), preferably a typical distillation column, comprising at least one inlet and two outlets.

In a preferred embodiment of the apparatus, either in or upstream the solvent regenerator column (1) metal sulphide particles are formed and a liquid stream comprising solvent, metal sulphide particles and optionally dissolved contaminants such as water is withdrawn from the bottom of the solvent regenerator and led via line (4) to a filter system (2) comprising at least one membrane. In filter system (2) the liquid stream is contacted with the membrane, thereby transferring metal sulphide particles from the liquid stream onto the membrane surface to obtain a liquid stream depleted of metal sulphide particles and a membrane enriched in metal sulphide particles. The liquid stream depleted of metal sulphide particles is led via line (5) to separation column (3), where separation of solvent and contaminants, such as water, takes place. Preferably, the separation column comprises internals to enhance separation of solvent and contaminants. It will be understood that deposition of metal sulphide particles on these internals can create problems. By using an apparatus comprising a filter system, these problems are avoided.

Suitably, a solvent comprising metal carbonyls and hydrogen sulphide and/or metal sulphide is led to the solvent regenerator column (1) via line (6) and metal sulphide particles are formed in the solvent regenerator column by heating.

Preferably, a liquid stream comprising solvent, and optionally dissolved contaminants such as water and metal sulphide particles is withdrawn from the bottom of the solvent regenerator (1) and is led to elsewhere via line (7) and another stream is led via line (4) to filter system (2). By only leading part of the stream from the solvent regenerator to the filter system, metal sulphide removal can be done faster and a small filter system is sufficient. In the filter system, removal of metal sulphide particles takes place, resulting in a liquid stream depleted of metal sulphide particles.

Preferably, a gas stream comprising inter alia hydrogen sulphide is led from the top of the solvent regenerator via line (8), suitably to a hydrogen sulphide disposal unit (not shown).

Preferably, the regenerated solvent from line (7) is used again, for example to remove metal carbonyls and hydrogen sulphide from a gas stream comprising these compounds.

Solvent that has been separated in separation column (3) is preferably led back to the solvent regenerator via line (9). Water and/or other contaminants are preferably led from the separation column (3) via line (10).

It will be understood that the apparatus may comprise more than one separation column and/or may comprise more than one regenerator column.

In a more preferred embodiment, all or part of the separation column (3) is integrated with all or part of the regenerator column (1). In a most preferred embodiment, the bottom section of the regenerator column is functionally extended to the top of the separation column, so that the separation column (3) is wholly integrated with the regenerator column (1).

The method and apparatus enables removing metal sulphide particles from the solvent to such an extent, that the solvent can be separated from contaminants with minimal risk of deposition of metal sulphide particles. For example, when a liquid stream comprising methanol and 200 mg/l of iron sulphide and nickel sulphide particles is fed to a separation column comprising trays at a feed rate of 2 m$^3$/h, even a deposition of 20% will result in encrustation of the trays with 1.9 kg solids per day in a 24 hour operation. This results in a frequent need for repair and maintenance of the separation column, with a considerable down time. The method and apparatus of the invention enable reduction of the amount of encrustation practically to zero, thereby greatly reducing the down time of the separation column.

That which is claimed is:

1. A method for removal of metal sulphide particles and dissolved contaminants from a liquid stream obtained by the steps of (i) contacting a gas stream comprising hydrogen sulphide and metal carbonyls with a solvent, thereby obtaining a solvent enriched in hydrogen sulphide and in metal carbonyls; and (ii) heating and depressurising the solvent enriched in hydrogen sulphide and metal carbonyls in a solvent regenerator, thereby converting at least part of the metal carbonyls to metal sulphide particles, to obtain the liquid stream comprising solvent and metal sulphide particles and dissolved contaminants; said metal sulphide particle and dissolved contaminant removal method comprising the steps of:

withdrawing a liquid stream comprising solvent, metal sulphide particles and dissolved contaminants from said solvent regenerator;

dividing said liquid stream into two parts;

using the first part of said liquid stream to remove further amounts of metal carbonyls and hydrogen sulphides from a gas stream comprising these compounds;

contacting the second part of said liquid stream with a filter system comprising a porous membrane having a crosslinked structure and a pore size less than 0.1 micron, said porous membrane allowing a flux of at least 1200 kg/m$^2$/day, thereby transferring metal sulphide particles from said liquid stream onto the membrane surface to obtain a liquid stream depleted of metal sulphide particles and a filter system comprising a membrane enriched in metal sulphide particles;

passing said liquid stream depleted of metal sulphides to a separation column wherein water and other dissolved contaminants in said liquid stream are separated from the solvent in said liquid stream; and using the said solvent from said separation column to remove metal carbonyls and hydrogen sulphide from gas streams containing these compounds.

2. A method according to claim 1, wherein the average particle size of the metal sulphide particles is in the range of from 10 nm to 5 micron.

3. A method according to claim 1, wherein the membrane is porous and the smallest pore size of the membrane is lower than the size of the smallest metal sulphide particles.

4. A method according to claim 3, wherein the pore size of the membrane is less than 0.01 micron.

5. A method according to claim 1, wherein the membrane is of the type commonly used for ultrafiltration, nanofiltration or reverse osmosis, especially ultrafiltration.

6. A method according to claim 1, wherein the membrane is fabricated from one or more materials selected from the group consisting of glass fibre, cellulose, celluloseacetate, ceramic materials, metal mesh, polyacrylonitrile (PAN), polyamineimide+titaniumdioxide (PAI), polyetherimide (PEI), polyvinylidenedifluoride (PVDF) and polytetrafluoroethylene (PTFE).

7. A method according to claim 1, wherein the membrane is a dense membrane having sufficient permeability for the solvent.

8. A method according to claim 1, wherein the membrane is fabricated from polysiloxane.

9. A method according to claim 1, wherein the liquid stream comprises at least 4 ppmv metal sulphide particles.

10. A method according to claim 1, wherein the solvent comprises methanol.

11. A method according to claim 1, wherein the metal sulphide particles include nickel carbonyl or iron carbonyl, or both.

12. A method according to claim 1, wherein the membrane is one coated with a layer of a coating substance onto which metal sulphide particles have been transferred from the liquid stream to the membrane so as to adhere to the coating substance to obtain a layer of coating substance enriched with metal sulphide particles.

13. A method according to claim 12, wherein the layer of coating substance enriched with metal sulphide particles is rinsed off the membrane and discarded.

14. A method according to claim 13, wherein a fresh layer of coating substance is applied to the membrane after rinsing off the layer of coating substance enriched with metal sulphide particles.

15. A method according to claim 1, wherein the filter system further comprises filter elements and the method further comprises cleansing the membrane enriched in metal sulphide particles by moving the filter elements in a vigorous vibratory motion tangent to the surface of the membrane enriched in metal sulphides, thereby causing metal sulphide particles to be repelled from the membrane surface.

16. A method according to claim 1, wherein the filter system further comprises filter elements and the method further comprises cleansing the membrane enriched in metal sulphide particles by rotating the filter elements to create a shear force on the membrane enriched in metal sulphides, thereby causing metal sulphide particles to be repelled from the membrane surface.

17. A method according to claim 1, wherein step (i) is performed at a temperature in the range of from −70 to 40° C. and step (ii) is performed at a temperature in the range of from 60 to 110° C.

18. A method according to claim 17, wherein step (i) is performed at a temperature in the range of from −60 to 0° C.

19. A method according to claim 17, wherein step (ii) is performed at a temperature in the range of from 70 to 90° C.

20. A method according to claim 10, wherein the dissolved contaminant removed in the separation column is water.

21. A method according to claim 6 wherein the membrane is fabricated from polyvinylidenedifluoride (PVDF).

22. A method according to claim 1 wherein all or part of said separation column is integrated with all or part of said solvent regenerator.

* * * * *